US006666083B2

(12) United States Patent
Demia

(10) Patent No.: US 6,666,083 B2
(45) Date of Patent: Dec. 23, 2003

(54) APPARATUS FOR DETECTING FRAUD ON A FLUID METER

(75) Inventor: Laurent Demia, Macon (FR)

(73) Assignee: Actaris S.A.S. (FR)

( * ) Notice: Subject to any disclaimer, the term of this patent is extended or adjusted under 35 U.S.C. 154(b) by 0 days.

(21) Appl. No.: 10/163,211

(22) Filed: Jun. 5, 2002

(65) Prior Publication Data
US 2002/0189343 A1 Dec. 19, 2002

(30) Foreign Application Priority Data
Jun. 7, 2001 (FR) ............................................. 0107758

(51) Int. Cl.[7] ................................................ G01F 15/00
(52) U.S. Cl. ........................................................ 73/275
(58) Field of Search ............................................ 73/275

(56) References Cited

U.S. PATENT DOCUMENTS

| | | |
|---|---|---|
| 1,971,361 A | 8/1934 | Weisser |
| 2,297,528 A | 9/1942 | Bell |
| 4,245,504 A * | 1/1981 | Albrecht ...................... 73/275 |
| 4,663,970 A | 5/1987 | Sutherland |
| 5,957,330 A | 9/1999 | Rempt |

FOREIGN PATENT DOCUMENTS

DE 198 19 870 11/1999

* cited by examiner

*Primary Examiner*—Harshad Patel
(74) *Attorney, Agent, or Firm*—Straub & Pokotylo; Michael P. Straub

(57) ABSTRACT

A meter, in particular a fluid meter, having a meter body provided with a flow rate measuring device, a counter mounted on the meter body and provided in a top portion with a display for displaying the quantity of fluid that has been consumed, and in a bottom portion with a converter device for converting the fluid flow rate into the quantity of fluid that has been consumed, and fraud indicator assembly associated with the top portion. A portion of the fraud indicator assembly being designed to be partially or totally detached from the top portion so as to totally block the operation of the converter device after an attempt at fraud has been made on the meter, even if the mechanical action involved in the fraud is no longer applied.

8 Claims, 3 Drawing Sheets

APPARATUS FOR DETECTING FRAUD ON A FLUID METER

The present invention relates to a method of detecting fraud or attempted fraud on a fluid meter. The invention also relates to apparatus for implementing the method.

BACKGROUND OF THE INVENTION

A fluid meter 1 as shown in FIG. 1 generally comprises a first housing 2 provided with means for measuring a fluid flow rate, a second housing which forms a counter 5 mounted on the first housing and provided on its top portion 8 with display means 7 for displaying the quantity of fluid that has been consumed, and in its bottom portion with converter means 6 for converting the fluid flow rate into a quantity of fluid consumed.

It is known that meters can be made proof against certain types of fraud by improving certain mechanical characteristics of such meters, e.g. the ability of counters to withstand crushing. That solution is expensive since it requires additional material to be used so as to obtain greater strength.

It is also known to provide means that make it possible to identify that an attempt at fraud has been made, for example by using a visible indicator. Under certain conditions, that solution remains ineffective, in particular when the meter is not easily accessible or when the meter is read remotely by an automatic remote reading system which means that a human meter reader does not have the opportunity to observe the state of the meter.

OBJECT AND SUMMARY OF THE INVENTION

The object of the invention is to avoid those drawbacks by proposing a method and apparatus for detecting fraud at low cost, that are easily adaptable to existing meters without it being necessary to modify their structure to any very great extent, and making it easy and reliable to detect fraud or attempted fraud.

This object is achieved by apparatus for detecting fraud on a meter, in particular a fluid meter comprising a meter body having means for measuring a fluid flow rate, a counter mounted on the meter body and provided in its top portion with means for displaying the quantity of fluid that has been consumed and in its bottom portion with converter means for converting the fluid flow rate into the quantity of fluid that has been consumed, and fraud indicator means associated with the top portion, a portion of said fraud indicator means that is visible from outside the counter being designed to become detached or to deform irreversibly relative to the top portion so as to block the operation of the converter means completely in the event of an attempted fraud on the meter.

In the method of detecting meter fraud when an attempt at fraud is made on the meter, in particular on a fluid meter, the method consists in: detaching or deforming a portion of the fraud indicator means of the top portion, said portion of the fraud means indicator means being visible from outside the counter and being caused to penetrate into the converter means in order to block the operation of said converter means.

Said portion of the fraud indicator means can be partially or totally detached when a top wall of the counter comes into contact with said portion of the fraud indicator means.

The invention presents the advantage that the index giving water consumption remains stuck on a value and can no longer move, so that the fluid supplier who re-reads the index is warned by the fact that consumption has not changed between two successive readings. Thus, the supplier can take appropriate measures for replacing the defective meter. The fact that the meter is blocked and that the index remains stuck is much more advantageous than a tampered meter which continues to meter consumption but which underestimates it since the time required to detect the fraud is much shorter for a blocked meter.

Another advantage is that the fraud indicator means serve not only as blocking means for preventing the counter from operating, but also as an indicator that reveals attempted fraud and that is visible from outside the counter.

Another advantage is that even if the mechanical action that is intended to tamper with the meter ceases (for example removal of the pliers that have been used for crushing the counter), the counter remains blocked in permanent manner.

The invention can be applied to water meters, to gas meters, and also to any fluid meter where a problem can arise that is similar to the problem set out in the present specification.

BRIEF DESCRIPTION OF THE DRAWINGS

Other advantages and characteristics of the invention appear in the following detailed description of various non-limiting embodiments given with reference to the accompanying drawings, in which.

MORE DETAILED DESCRIPTION

Figure 1:
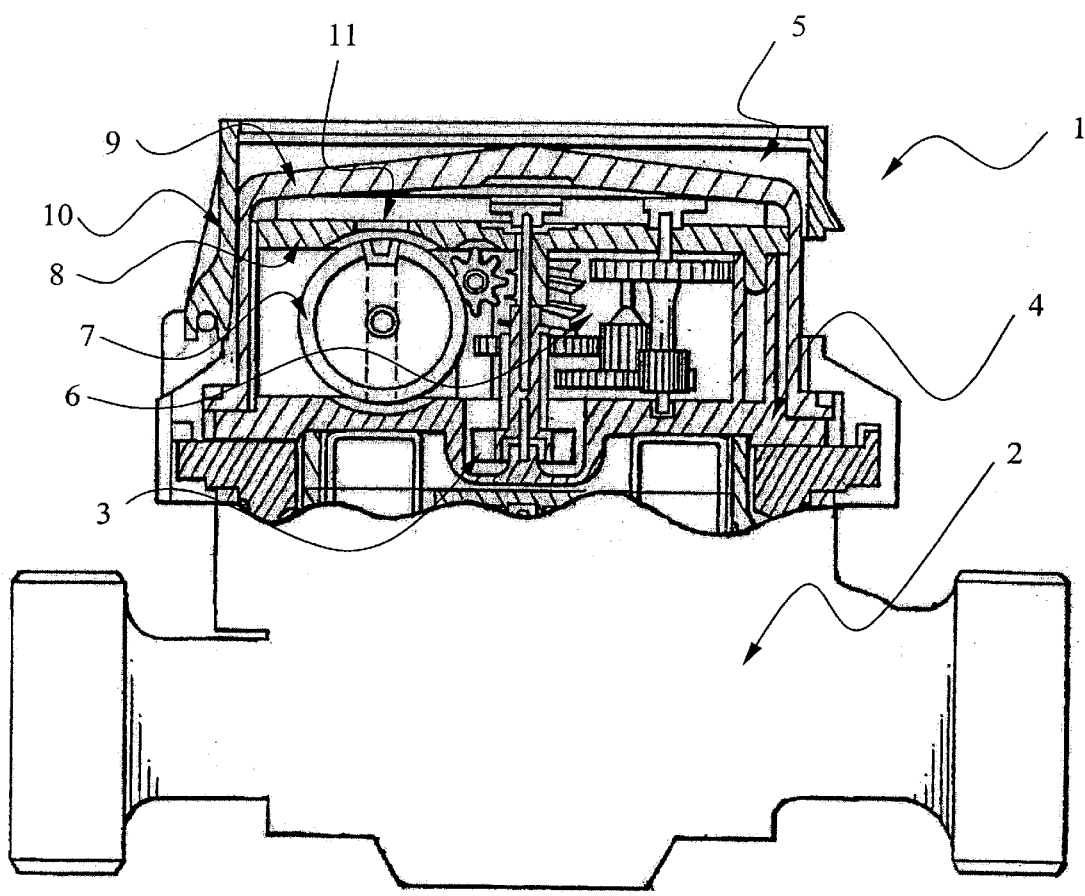
FIG. 1 is a fragmentary section view of a meter provided with a prior art counter.

As shown in the side view in partial section of FIG. 1 and as given overall reference 1, a conventional fluid meter, e.g. a water meter, comprises a first housing 2 containing a measurement chamber which communicates with a water inlet and a water outlet.

The fluid meter may be of the turbine type or of the reciprocating piston type. The piston or the turbine (not shown) of the measurement chamber transfers its rotary motion to a magnetic coupling member 3 shown in part in FIG. 1. By way of example, the magnetic coupling system is constituted by two magnetized elements placed on opposite sides of a wall 4 separating the first housing 2 from a second housing 5. The coupling member 3 communicates the rotary motion of the piston or the turbine to a shaft which is mechanically connected to a gear train 6. The second housing 5 forms a counter with display wheels co-operating in conventional manner with the gear train 6 so that the metering information transmitted by the piston or the turbine gives rise to suitable rotation of the wheels 7 and thus to the corresponding fluid consumption being displayed.

The coupling between the piston and the gear train could equally well be formed by a non-magnetic coupling system including a shaft passing through the wall 4.

In fluid meters, and in particular in water meters 1 as shown in FIG. 1, it is known to place a counter 5 in a housing, the counter having wheels which firstly respond mechanically and/or magnetically to receive metering information concerning a fluid volume as supplied by the first housing 2 containing a measuring element in contact with the fluid, and secondly display said information on said wheels 7 which are visible from outside the housing through a slot 11 made in a wall 8 of the housing. Generally, the counter 5 is in the form of a block whose top wall 9 is made of a plastics material that is transparent at least in its portion which can be seen from the outside and in which the wheels 7 are located. A pivoting protective cap 10 can also be fixed on the meter so that while the cap is in the lowered position particles of all kinds are prevented from becoming deposited on the top wall of the block 9 which might impede reading the wheels.

When the cap is raised, since the block 9 is transparent and in register with the slot 11 in the wall 8, an observer looking at the counter can see the wheels 7 of the counter and can read the digits carried by the wheels.

Figure 2:
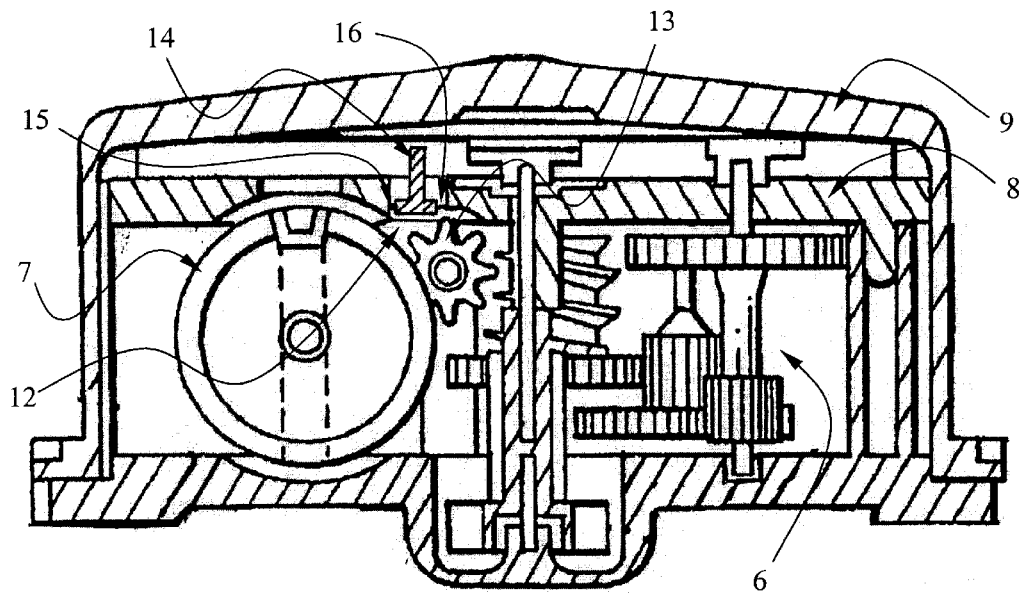
FIG. 2 shows a first embodiment of a fraud detector device for integrating in the FIG. 1 counter, prior to any attempt at fraud taking place.
Figure 3:
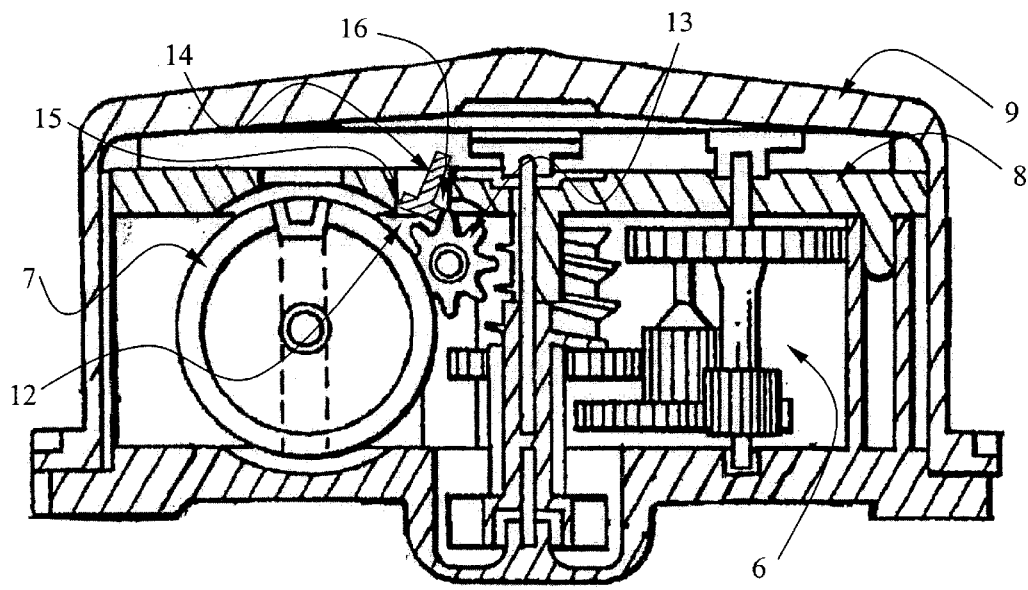
FIG. 3 shows a first embodiment of a fraud detector device for integrating in the FIG. 1 counter, after an attempt at fraud has taken place.

A first embodiment of the invention is shown in FIGS. 2 and 3 which are a section view of the counter 5 without its protective cover, and respectively they show the counter before and after an attempted fraud.

A slot 12 is formed in the wall 8 over a gearwheel or ratchet 13 of the gear train 6.

A part 14 is fixed in the slot so that a portion of said part projects from the slot towards the top wall of the block 9.

The part 14 is held in place by means of at least one abutment 15. Advantageously, the part 14 is held by means of two abutments 15 and 16.

When external mechanical action is exerted on the counter, e.g. in an attempt at fraud, the transparent plastic top wall of the counter block 9 receives the major portion of the applied static and dynamic forces. When the top of the wall 9 yields, it comes into contact with the part 14, thereby deforming or breaking one or both abutments 15, 16. The deformed or detached part then blocks the gearwheel or ratchet 13 of the gear train 6.

The part 14 deforms or becomes detached completely or in part depending on the force of the mechanical action that is exerted and/or on the strength of the material used for making the abutment(s) 15, 16.

FIG. 3 shows a variant embodiment of this first embodiment in which the part is fixed by means of two abutments 15, 16 and in which breaking only one abutment 16 causes the toothed wheel or ratchet 13 to be blocked, thereby blocking the wheels 7 of the counter. This variant is particularly advantageous since under such circumstances, it is entirely certain that the wheels of the counter will be blocked regardless of the position of the fluid meter once it has been put into place on a pipe.

In other possible variants that are not shown, the abutments 15, 16 deform or become totally detached so as to block the toothed wheel or ratchet 13.

It should be observed that this blocking is permanent even if the external mechanical action exerted on the counter slackens or ceases.

Figure 4:
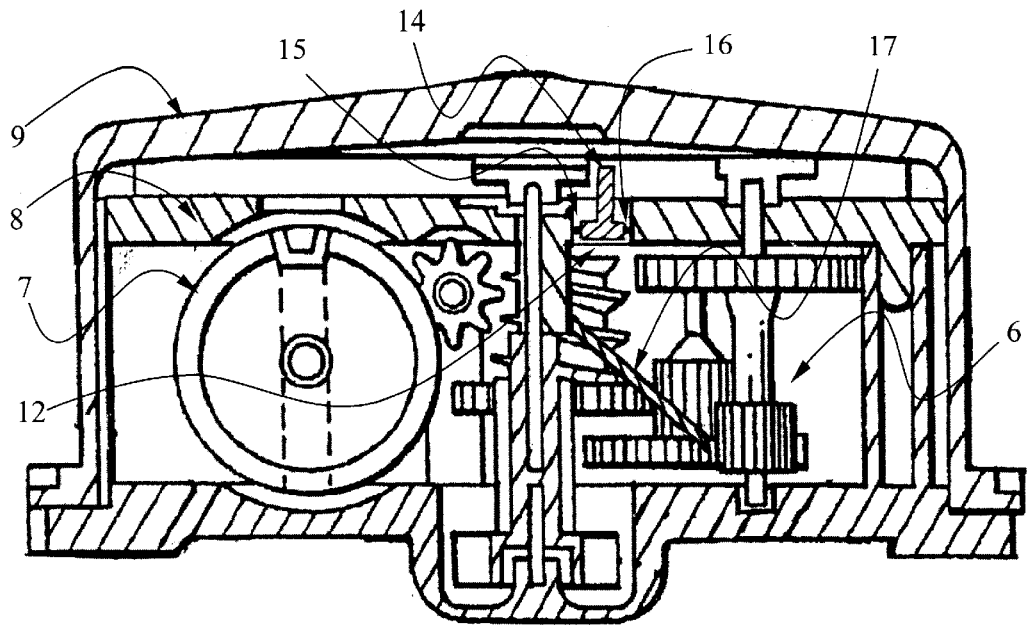
FIG. 4 shows a second embodiment of a fraud detector device for integrating in the FIG. 1 counter, prior to any attempt at fraud taking place.
Figure 5:
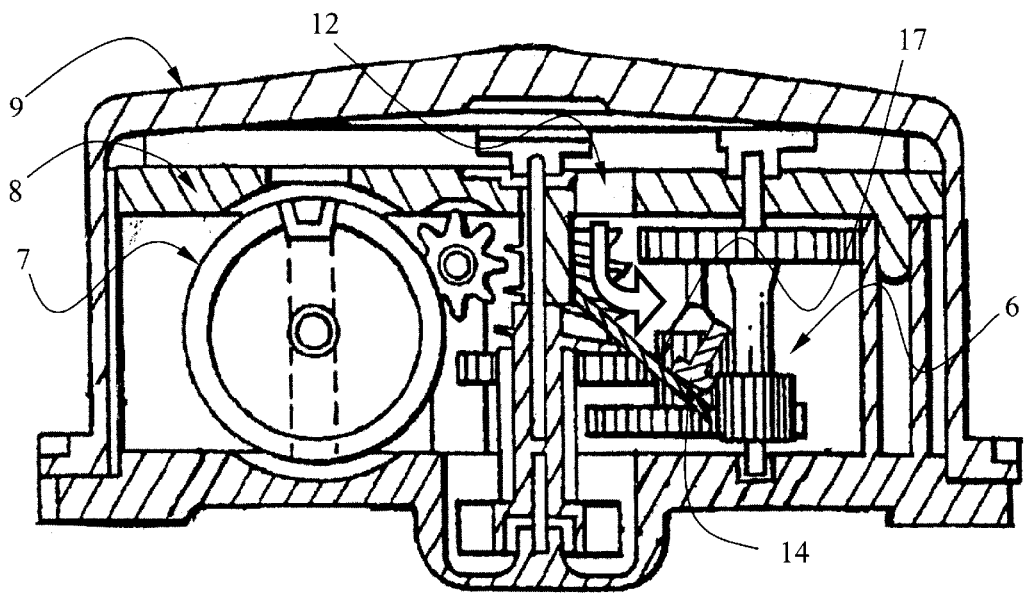
FIG. 5 shows a second embodiment of a fraud detector device for integrating in the FIG. 1 counter, after an attempt at fraud has taken place.

A second embodiment of the invention is shown in FIGS. 4 and 5, which show a counter 5 without is protective cap in section view respectively before and after an attempted fraud.

A slot 12 is formed through the wall 8. In this embodiment, the slot is not formed directly over a gearwheel or ratchet 13 of the gear train 6. A sloping plane 17 is provided in the counter beneath the slot 12 extending towards a gearwheel or ratchet of the gear train 6.

The part 14 is fixed in the slot in such a manner that a portion of said part projects from the slot towards the top wall of the block 9.

The part 14 is fixed by means of at least one abutment 15. Advantageously, the part 14 is fixed by means of two abutments 15, 16.

When an external mechanical action is exerted on the counter, e.g. in an attempt at fraud, the transparent plastic top wall of the counter block 9 yields and comes into contact with the part 14, thereby causing the abutment(s) 15, 16 to rupture. The detached part then drops under gravity onto the sloping plane 17 and slides in the direction of the arrow shown in FIG. 5 towards the portion of the gear train that is to be blocked. At the end of its stroke, the part then blocks the gearwheel or ratchet 13 of the gear train 6.

The strength of the material used for the abutment(s) 15, 16 is designed to ensure that the part 14 becomes fully detached regardless of the force of the mechanical action exerted on the top wall of the block 9.

In all of the embodiments and variants described, the shape of the cross-section of the part 14 is that of an upside-down T-shape comprising a base with a rod fixed thereto. Advantageously, the base forms a plate of shape that matches the shape of the slot but of dimensions that are smaller, for example a plate of cylindrical shape, while the rod is in the form of an elongate cylinder. Other shapes enabling the part 14 to perform its function can also be envisaged.

What is claimed is:

1. Apparatus for detecting fraud on a meter, in particular a fluid meter comprising a meter body having means for measuring a fluid flow rate, a counter mounted on the meter body and provided in its top portion with means for displaying the quantity of fluid that has been consumed and in its bottom portion with converter means for converting the fluid flow rate into the quantity of fluid that has been consumed, and fraud indicator means associated with the top portion, wherein a portion of said fraud indicator means that is visible from outside the counter is designed to become detached or to deform irreversibly relative to the top portion so as to block the operation of the converter means completely in the event of an attempted fraud on the meter.

2. A meter according to claim 1, in which the top portion comprises a wall, the converter means comprise a gear train provided with at least one gearwheel, and the portion of said fraud indicator means comprises a part fixed in a slot made in the wall by means of at least one abutment.

3. A meter according to claim 2, in which the part is in the form of an upside-down T-shape and a portion of said part projects from the slot towards a top wall of the counter.

4. A meter according to claim 2, in which a sloping plane is fixed inside the counter beneath the slot and is directed towards the gear train.

5. A fluid meter, comprising a meter body having means for measuring a fluid flow rate, a counter mounted on the meter body and provided in its top portion with means for displaying the quantity of fluid that has been consumed, and in its bottom portion with converter means for converting the fluid flow rate into the quantity of fluid that has been consumed, and fraud indicator means associated with the top portion, a portion of the fraud indicator means becoming detached from the top portion, in the event of an attempted fraud on the meter, said portion of the fraud indicator means being visible from outside the counter and being caused to penetrate into the converter means in order to block the operation of said converter means in response to an attempted fraud on the meter.

6. A fluid meter according to claim 5, wherein the portion of the fraud indicator means is partially detached when a top wall of the counter comes into contact with said portion of the fraud indicator means.

7. A fluid meter according to claim 5, in which the portion of the fraud indicator means is completely detached when a top wall of the counter comes into contact with said portion of the fraud indicator means.

8. A fluid meter, comprising a meter body having means for measuring a fluid flow rate, a counter mounted on the meter body and provided in its top portion with means for displaying the quantity of fluid that has been consumed, and in its bottom portion with converter means for converting the fluid flow rate into the quantity of fluid that has been consumed, and fraud indicator means associated with the top portion, wherein, a portion of the fraud indicator means associated with the top portion being responsive to an attempted fraud on the meter by becoming irreversibly deformed, said portion of the fraud indicator means being visible from outside the counter and operating to penetrate into the converter means in order to block the operation of said converter means in response to an attempted fraud.

* * * * *